US011075932B2

(12) United States Patent
Sansom et al.

(10) Patent No.: US 11,075,932 B2
(45) Date of Patent: Jul. 27, 2021

(54) APPLIANCE EXTENSION FOR REMOTE COMMUNICATION WITH A CYBER SECURITY APPLIANCE

(71) Applicant: Darktrace Limited, Cambridge (GB)

(72) Inventors: David Sansom, Cambridge (GB); Jack Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 353 days.

(21) Appl. No.: 16/278,998

(22) Filed: Feb. 19, 2019

(65) Prior Publication Data

US 2019/0260770 A1 Aug. 22, 2019

Related U.S. Application Data

(60) Provisional application No. 62/632,623, filed on Feb. 20, 2018.

(51) Int. Cl.
*H04L 29/06* (2006.01)
*G06N 20/10* (2019.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
CPC ..... H04L 63/02; H04L 63/0209; H04L 63/04; H04L 63/0428; H04L 63/14;
(Continued)

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom (Continued)

*Primary Examiner* — Khang Do
(74) *Attorney, Agent, or Firm* — Rutan & Tucker, LLP

(57) ABSTRACT

The appliance extension is designed and constructed to be a secure extension of the threat visualizer user interface of the cyber security appliance installed in the system with a limited set of functions including monitoring, investigating, and taking actions to counter the detected cyber threat, all of which an operator can securely take from the appliance extension; rather than, needing to log into the cyber security appliance and investigate potential cyber threats at a location where the cyber security appliance is installed in the system.

18 Claims, 9 Drawing Sheets

(51) Int. Cl.

| | | |
|---|---|---|
| *G06N 20/00* | (2019.01) | |
| *G06N 20/20* | (2019.01) | |
| *H04L 12/58* | (2006.01) | |
| *G06F 21/36* | (2013.01) | |
| *H04L 12/26* | (2006.01) | |
| *G06F 16/2455* | (2019.01) | |
| *G06F 3/0484* | (2013.01) | |
| *G06F 3/0486* | (2013.01) | |
| *H04L 12/24* | (2006.01) | |
| *G06K 9/62* | (2006.01) | |
| *G06F 21/55* | (2013.01) | |
| *G06F 40/40* | (2020.01) | |

(52) U.S. Cl.
CPC .......... *G06F 16/2455* (2019.01); *G06F 21/36* (2013.01); *G06F 21/554* (2013.01); *G06F 21/556* (2013.01); *G06F 40/40* (2020.01); *G06K 9/622* (2013.01); *G06K 9/6218* (2013.01); *G06N 20/00* (2019.01); *G06N 20/10* (2019.01); *G06N 20/20* (2019.01); *H04L 41/22* (2013.01); *H04L 43/045* (2013.01); *H04L 51/12* (2013.01); *H04L 51/22* (2013.01); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/20* (2013.01)

(58) Field of Classification Search
CPC ............ H04L 63/1408; H04L 63/1416; H04L 63/1425; H04L 63/1441; H04L 63/20; G06F 21/30; G06F 21/31; G06F 21/50; G06F 21/55
See application file for complete search history.

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 8,312,540 B1 | 11/2012 | Kahn et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 * | 8/2015 | Sawhney .............. H04L 12/185 |
| 9,106,691 B1 * | 8/2015 | Burger ................ H04L 63/1483 |
| 9,185,095 B1 | 11/2015 | Moritz et al. |
| 9,213,990 B2 | 12/2015 | Adjaoute |
| 9,401,925 B1 | 7/2016 | Guo et al. |
| 9,516,039 B1 | 12/2016 | Yen et al. |
| 9,516,053 B1 * | 12/2016 | Muddu .................... G06N 5/04 |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,362,046 B1 * | 7/2019 | Srinivasan .......... H04L 63/1433 |
| 10,673,880 B1 * | 6/2020 | Pratt ....................... G06N 20/00 |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0314447 A1 * | 10/2016 | Trevathan ............. G06F 21/105 |
| 2016/0352768 A1 | 12/2016 | Lefebvre et al. |
| 2016/0373476 A1 | 12/2016 | Dell'Anno et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0085587 A1 * | 3/2017 | Turgeman ........... G06F 3/03547 |
| 2017/0169360 A1 | 6/2017 | Veeramachaneni et al. |
| 2017/0171235 A1 * | 6/2017 | Mulchandani ...... H04L 63/1433 |
| 2017/0215208 A1 * | 7/2017 | Burnham ............... G16H 10/60 |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0251012 A1 | 8/2017 | Stockdale et al. |
| 2017/0270422 A1 | 9/2017 | Sorakado |
| 2018/0027006 A1 | 1/2018 | Zimmermann et al. |
| 2018/0034837 A1 * | 2/2018 | Lakhani .............. H04L 63/1425 |
| 2018/0096153 A1 * | 4/2018 | DeWitte ................ G06F 21/552 |
| 2018/0167402 A1 | 6/2018 | Scheidler et al. |
| 2018/0358009 A1 * | 12/2018 | Daley ...................... G06F 3/167 |
| 2019/0095320 A1 * | 3/2019 | Biswas ................. G06F 21/552 |
| 2019/0109864 A1 * | 4/2019 | Eren ...................... H04W 12/12 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol 7465, Springer, Berlin, Heidelberg, Germany

* cited by examiner

FIG. 8 Network

APPLIANCE EXTENSION FOR REMOTE COMMUNICATION WITH A CYBER SECURITY APPLIANCE

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system.

BACKGROUND

The reality is that modern threats bypass the traditional legacy defense tools on a daily basis. These tools need a new tool based on a new approach that can complement them and mitigate their deficiencies. In the complex modern world it is advantageous that the approach is fully automated as it is virtually impossible for humans to sift through the vast amount of security information gathered each minute within a digital business.

SUMMARY

In an embodiment, an appliance extension may cooperate with a cyber security appliance. The appliance extension to perform multiple functions. The appliance extension has a monitoring module configured to monitor metrics and receive alerts regarding potential cyber threats on a system. The system can include 1) an email system, 2) a network, 3) a SaaS environment, 4) a cloud system, and 5) any combination of the email system, the network, the SaaS environment, and the cloud system. The appliance extension has an investigative module configured to retrieve and display metrics on a user interface to support investigations on potential cyber threats. The appliance extension has a remote response module configured to observe and send one or more control signals to an autonomous response module to take actions to counter one or more detected cyber threats, remotely from this appliance extension. The user interface cooperates with the modules to display their relevant information on a display screen. Instructions associated with one or more of the modules are stored in one or more memories and can be executed by one or more processors.

These and other features of the design provided herein can be better understood with reference to the drawings, description, and claims, all of which form the disclosure of this patent application.

DRAWINGS

The drawings refer to some embodiments of the design provided herein in which.

Figure 1:
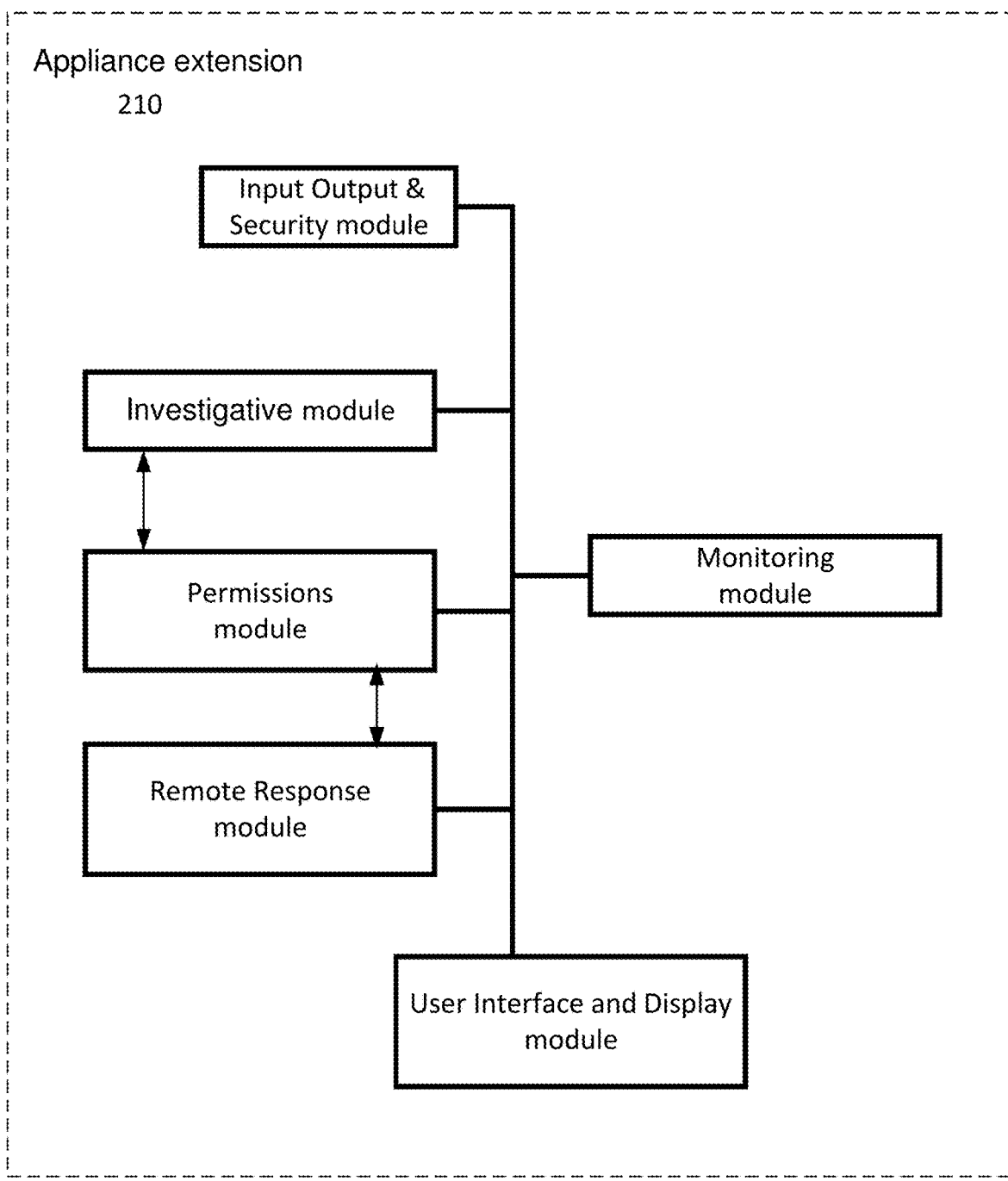
FIG. 1 illustrates a block diagram of an embodiment of an appliance extension with a number of different modules to perform various functions.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the appliance extension is designed and constructed to be a secure extension of the threat visualizer user interface of the cyber security appliance installed in the system with a limited set of functions including monitoring, investigating, and taking actions to counter the detected cyber threat, all of which an operator can securely take from the appliance extension; rather than, needing to log into the cyber security appliance and investigate potential cyber threats at a location where the cyber security appliance is installed in the system.

FIG. 1 illustrates a block diagram of an embodiment of an appliance extension with a number of different modules to perform various functions.

The appliance extension 210 can take form as an assembly, such as a collection of modules in a suitable mobile application resident on a smart mobile device and/or in a hand-held remote control. The appliance extension 210 can communicate remotely with a cyber security appliance/system located within an organization's virtual or physical network to monitor, investigate, and respond, to potential threats. The appliance extension 210 is designed to securely communicate with an externally facing backend server of a cyber security appliance protecting that network.

In an embodiment, a mobile application can be installed on a smart mobile device. Generally, registering an instance of the mobile application is restricted to authorized security professional within the organization.

The appliance extension 210 can perform at least three functions. The appliance extension 210 has a monitoring module configured to receive alerts regarding potential cyber threats on a system that may include but is not limited to, 1) an email system, 2) a network, 3) a SaaS environment, 4) a cloud system, and 5) any combination of the email system, the network, the SaaS environment, and the cloud system. The monitoring module is also configured to provide these metrics and alerts to the display module for visualization on the user interface. The appliance extension 210 has an investigative module configured to receive relevant contextual metrics from a cybersecurity appliance and display these on a user interface to support investigations on potential cyber threats. The appliance extension 210 has a remote response module configured to receive observations and recommended actions from an autonomous response module and return one or more control signals back to the autonomous response module to take actions to counter one or more detected cyber threats, remotely from this appliance extension 210.

The appliance extension 210 has a user interface to be displayed on a display screen. The user interface cooperates with the modules to display their relevant information on a display screen. The appliance extension 210 has instructions associated with one or more of the modules stored in one or more memories and that are executed by one or more processors.

A battery can power the modules, memories, processors, display screen, and other components on the appliance extension 210.

The appliance extension 210 provides a simplified version of the threat visualizer user interface hosted on a cybersecurity appliance and allows a user from a mobile device to collaborate and communicate with that cyber security appliance installed in their network as well as the autonomous defense actions initiated by the cyber security appliance installed in their network, to restrain, counter, and/or contain threats quickly enough from their smart mobile device, such as a smart phone, a tablet, etc. The remote response module allows the approval or control of automatic defense actions initiated by the cyber threat defense system to restrain or contain threats.

The cybersecurity appliance allows an individual with system administrator credentials to set up, per user, the privileges a user has whilst using the appliance extension. An administrator may authorize a particular user to register an instance of the mobile application with the server. The user must then register the instance of the app on their mobile device with the server.

The permissions may also include things like what functions that user can do with the investigative module and functions that the user can do with the remote response module.

The permissions can be set, per user, and be set by the administrator via the Account Permissions page in the cybersecurity appliance user interface. The permissions can be revoked at any time by the system administrator. When the administrator revokes the particular user's permission to use the appliance extension 210, then a communication is sent to the appliance extension 210 to cause deletions of data and instructions for the appliance extension 210 to occur, such as the model breach, actions taken, security information, and summary cached data within the appliance extension 210 is deleted for the given user.

The appliance extension 210 also allows a user to be promptly notified of in-progress cyber threats within an organization via a push notification sent from the appliance and routed to the device, via a server.

Overall, the appliance extension 210 is designed and constructed to be a secure extension of the threat visualizer user interface of the cyber security appliance installed in the system with a limited set of functions including the monitoring, the investigating, and the taking actions of to counter the detected cyber threat, all of which an operator can securely take from the appliance extension 210; rather than, needing to log into the cyber security appliance and investigate potential cyber threats at a location where the cyber security appliance is installed in the system.

Figure 2:
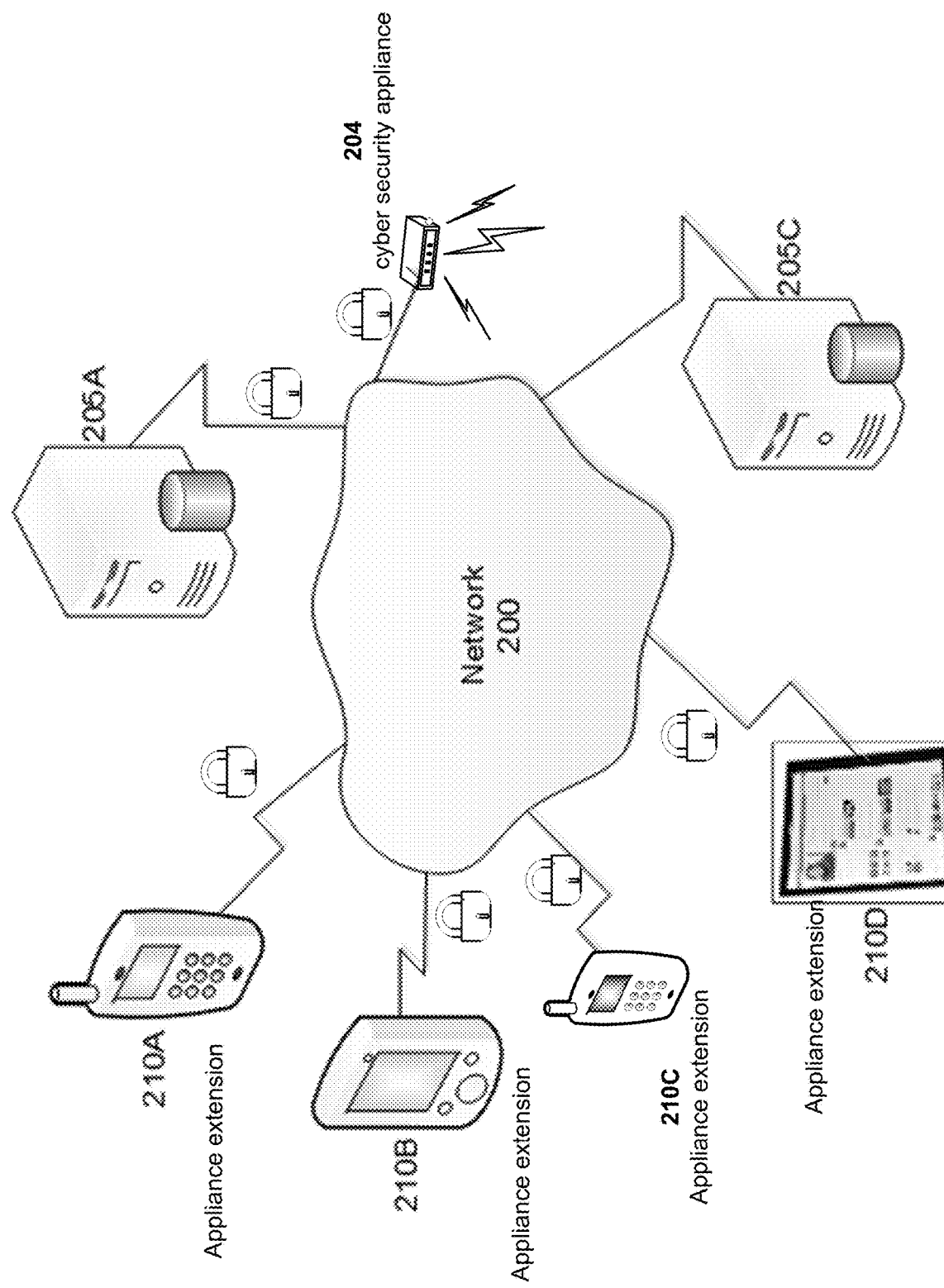
FIG. 2 illustrates a block diagram of an example appliance extension with instances of the mobile application resident on each mobile device i) to have access to and ii) communication with the cyber defense appliance installed in the system.

FIG. 2 illustrates a block diagram of an example appliance extension with instances of the mobile application resident on each mobile device to enable collaboration and communication with the cyber defense appliance installed in the system.

The appliance extension can be a mobile application installed on a smart mobile device, where the appliance extension is designed and constructed to be a secure extension of a threat visualizer user interface of the cyber security appliance installed in the system. Multiple appliance extensions 210A, 210C, and 210D, cooperate with a backend server 206A and a cyber security appliance 204.

The appliance extension can be a mobile application installed on any suitable smart mobile device 210A, 210C, and 210D (mobile applications on a smart phone or tablet) that needs to be registered. Likewise, the appliance extension can be a hand held remote control 210B that needs to be registered. As discussed, the appliance extension 210A-210D is designed and constructed to be a secure extension of a threat visualizer user interface of the cyber security appliance 204 installed in the system with a limited set of functions including the monitoring, the investigating, and the taking actions to counter the detected cyber threat, all of which an operator can securely take from the appliance extension 210A-210D; rather than, needing to log into the cyber security appliance 204 and investigate potential cyber threats at a location where the cyber security appliance 204 is installed in the system.

A system administrator can authorize specific users in the organization that can download and register an instance of the mobile application with a backend server 205A that is cooperating with the cyber security appliance 204. The mobile application is available from an online app store, such as the Apple or Google store.

The appliance extension 210A-210D needs to initially register and authenticate to do anything. The appliance extension 210A-210D requires a user authentication with the backend service, which can be authorized by a system administrator via a configuration setting in the cyber security appliance 204 itself. Once the mobile application is downloaded, the appliance extension 210A-210D can start a registration process of that instance of the appliance extension 210A-210D by, for example, i) scanning a QR code (discussed later) or ii) another mechanism generated from within the threat visualizer user interface on the cyber security appliance 204. On the user interface of the appliance extension 210A-210D, navigating to a "Register Mobile App" popup window available from the "Account Settings" tab from the Main Menu of the user interface of the cybersecurity appliance 210A-210D.

In an embodiment, a user, identified as a user that can be a registered user, needs to log in with their account and password to the cybersecurity appliance in order to allow a subsequent pop up window on the cyber security appliance 204 to be available and authenticate the appliance extension with the backend server 205A. The appliance extension 210A-210D can authenticate with the back-end service using the user's account username and password. The back-end service will authenticate the username/password with the cyber security appliance 204 and authorize the appliance extension. Periodically, this authentication can be refreshed if desired for enhanced security. After registration and authentication of the appliance extension 210A-210D, the backend server will authorize communications between the registered appliance extension 210A-210D and the cyber security appliances associated with that account. Note, each instance of the mobile application will be associated with a specific authorized user, who will be given their set of configurable permissions on the permissions page by the system administrator. The mobile application can also prompt the user to set up a PIN code or allow biometric authentication for subsequent local authentication.

Next, some additional preconditions must occur to allow a registration. In order to register instances of the appliance extension 210A-210D with one or more installed cyber security appliances, first, the threat visualizer user interface on the cyber security appliance 204 must be configured to be able to send alerts via a supported protocol. Alerts visible to the appliance extension 210A-210D through the back-end server can be filtered by the cybersecurity appliance based on user group access rights and other conditions. The cybersecurity appliance is configured to ensure an account exists for this system administrator and their supplied password and credentials are valid. The system administrator can authorize specific users in the organization that can register an instance of the mobile application with a backend server 205A that is cooperating with the cyber security appliance 204. Then one or more instances of mobile applications will be allowed to register, that instance of the mobile application, on their mobile device to the account in existence on the cybersecurity appliance via the backend server 205A.

In an embodiment, after the above example procedures, the mobile app is now downloaded, registered, authenticated, and resident on that user's smart mobile computing device, and subsequently run on that user's smart mobile computing device.

An instance of the appliance extension 210A-210D is required to be registered with a backend platform that is configured to communicate with the cyber security appliance 204. As discussed, the initial registration and authentication of its user and that instance of the appliance extension 210A-210D must occur. In addition, the instance of the appliance extension 210A-210D may be configured to permit use of a camera of the smart mobile device to scan a QR code generated from within the threat visualizer user interface of the cyber security appliance 204, which will could be utilized to verify whether this instance of the appliance extension 210A-210D is allowed to communicate with the cyber security appliance 204 installed in the system.

In an example method of authentication between the appliance extension and the cybersecurity system, the camera of the smart mobile device or hand held remote control of that instance of the appliance extension 210A-210D captures an image of the displayed QR code from the user interface of the cyber security appliance 204 associated with this account. The QR code passes the required authentication information to allow the mobile app to communicate with the one or more cyber security appliances associated with this account. The scanning of the QR code and following along successful communication between the mobile application, the backend server 205A, via a secured protocol, and the cyber security appliance 204, then that instance of the appliance extension 210A-210D has completed its registration.

A registered instance of the appliance extension 210A-210D on the smart mobile device or hand held remote control, the backend server 205A, and the cyber security appliance 204 can communicate securely via at least using a secure protocol as well as a need to authenticate with a unique signature and/or individual user account credentials.

All communications are made via a secure socket protocol, such as Secure Sockets Layer (SSL), TLS, or HTTPS, to establish encrypted links between the on-line backend server 205A, the cyber security appliance 204 and each instance of the appliance extension 210A-210D. A registered and known instance of the appliance extension 210A-210D communicates directly with the backend server 205A and the backend server 205A communicates with the cyber security appliance 204. The backend server 205A, such as an IMAP server, can act as a middle man/proxy to insert extra degrees of separation between information communications from instances of the appliance extension 210A-210D and the one or more cyber security appliance 204 installed in the system. The cyber security appliance 204 exchanges information with the backend server 205A, via a secure socket protocol, to be routed to a known and registered instance of the appliance extension 210A-210D via a secure socket protocol between the appliance extension 210A-210D and the backend server 205A. Likewise, the known registered mobile application sends communications to the backend server 205A, via a secure socket protocol, to be routed, via another secure socket protocol to the cyber security appliance 204.

All data payload in the communications can themselves be encrypted from end to end and only an individually a registered instance of the appliance extension 210A-210D and the cyber security appliance 204 have been configured to decipher the encrypted data payload in the communications which also use the secure socket protocol. Thus, the monitoring module in an instance of the appliance extension 210A-210D is configured to receive data payload, such as the alerts, securely transmitted from the cyber security appliance 204, via using a security protocol as well as encrypting data itself being transmitted between the appliance extension 210A-210D and the cyber security appliance 204 installed in the system. The appliance extension 210A-210D has one or more cipher algorithms to decipher the encrypted data payload.

In addition, malicious individuals and malware are prevented from tapping into the communications and then sending a substitute communication via i) through a use of the secure encryption protocol for the exchanged messages as well as ii) through a use of one or more methods of identity verification associated with the communications between the cyber security appliance 204 and registered instances of the appliance extension 210A-210D.

Note, a back-end server with REST API can have benefits over an IMAP server. For example, delivery from the IMAP server can be slow without frequent polling, which is improved with the back-end server with the REST API. A limit to an amount of frequent polling can be restricted by a platform chosen as well as reducing frequent polling help to manage battery usage.

The backend server 205A can use push notifications for real time interactions. The back-end server can be deployable on a customer's premises or a suitable cloud service.

An instance of the example appliance extension 210A-210D is configured with a set of access permissions to the cyber security appliance 204 that specify definitions for Administration functions, Alert and Data Fetching functions, Collaboration functions, etc. Likewise, the access permissions for the cyber security appliance 204 can be made available in an instance of the appliance extension 210A-210D when it registers.

As discussed, the registered mobile application on the smart device and the cyber security appliance 204 communicate via a backend server securely, via at least 1) using a secure protocol as well as 2) requiring a need to authenticate communications with unique identification verification.

Thus, even if a malicious individual could break the secure socket protocol, the malicious individual would need to also duplicate the identity verification methods used in communications between the appliance extension 210A-210D and the cyber security appliance 204 via the backend server. The verifiable valid identity of the cyber security appliance 204 is capable of being verified/authenticated by the appliance extension 210A-210D.

Next, the appliance extension 210A-210D is configured to interact and display an integration of multiple organizational platforms, all monitorable and controllable from this single appliance extension 210A-210D. The appliance extension 210A-210D's agnostic nature of monitoring and displaying of, for example, the model breaches on a first cyber security appliance installed in a network (e.g. see FIG. 8), a second cyber security appliance installed in a SaaS environment, a third cyber security appliance installed in a cloud environment, a fourth cyber security appliance installed in an email system, etc. on a same instance of the appliance extension 210A-210D. In the appliance extension 210A-210D malicious activity is all treated in the same way and produce the same kind of threat alert, including model breaches, meaning that the user will see threats from a vast range of platforms in one place and can tackle them equally and from a single location. An instance of the appliance extension 210A-210D registered with each of these cyber security appliances has the ability to monitor a huge distributed network across multiple layers from one centralized location remotely.

An instance of the appliance extension 210A-210D can improve the computing system. The appliance extension 210A-210D can be a mobile application located on a mobile device; and thus, avoids a user needing to power up and use a laptop or desktop computer to monitor the system.

Figure 3:
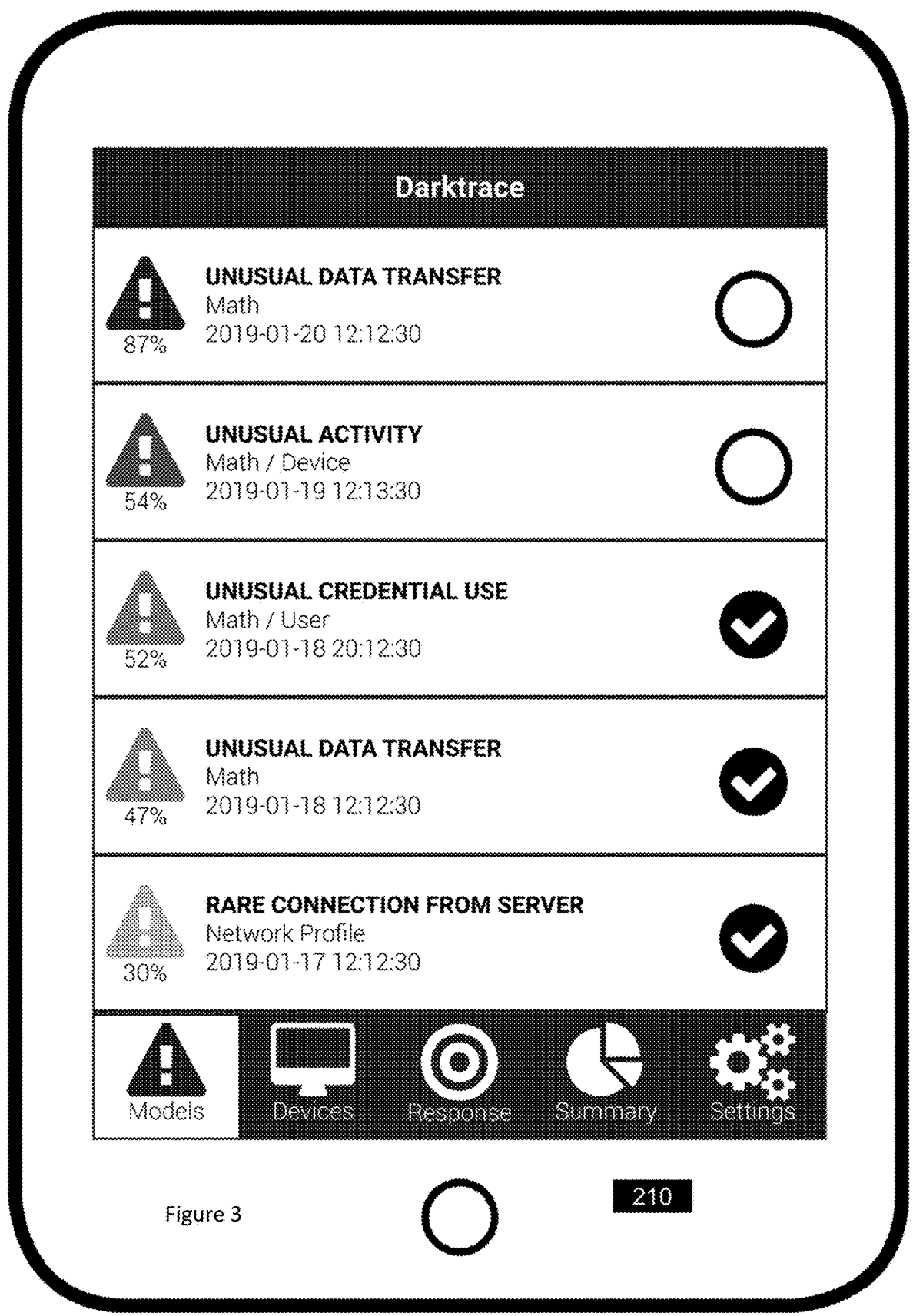
FIG. 3 illustrates a diagram of an example appliance extension with a monitoring module and an investigative module cooperating with the user interface to retrieve and display metrics on potential cyber threats causing a model breach.

FIG. 3 illustrates a diagram of an example appliance extension with a monitoring module and an investigative module cooperating with the user interface to retrieve and display metrics on potential cyber threats causing a model breach.

The appliance extension 210 includes, for example, multiple screens: a Models screen; a Devices screen; and a Summary screen, which come from the monitoring module and investigative module.

The Models screen displays a list of models with recent breaches, one row for each unique model which may have multiple breach instances. (See FIG. 3) The list of models can be sorted by the model with the highest breach threat score or most recent breach. The breach count shows the number of recent breaches for that model.

Figure 4:
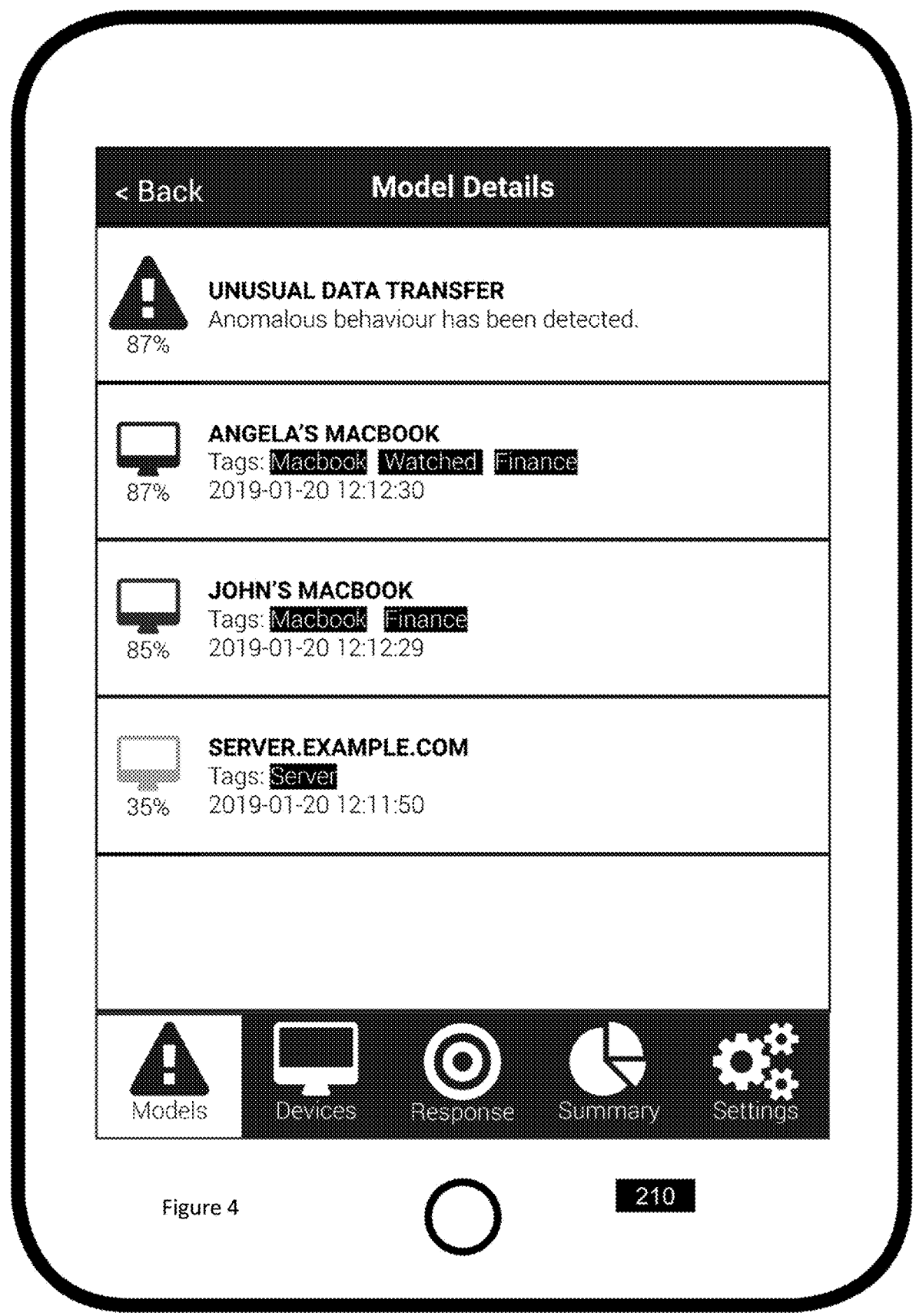
FIG. 4 illustrates a diagram of an example appliance extension with a monitoring module and an investigative module cooperating with the user interface and the cyber security appliance to retrieve and display additional details on a specific model breach.

Tapping on a model breach will open the Model Details screen. (See FIG. 4) FIG. 4 illustrates a diagram of an example appliance extension 210 with a monitoring module and an investigative module cooperating with the user interface and the cyber security appliance to retrieve and display additional details on a specific model breach. This shows all the recent breaches for the selected model (depending on filter options). For each breach instance, the triggering device is listed. There is one row per breach, so a device may appear multiple times if it triggered the breach repeatedly.

Figure 5:
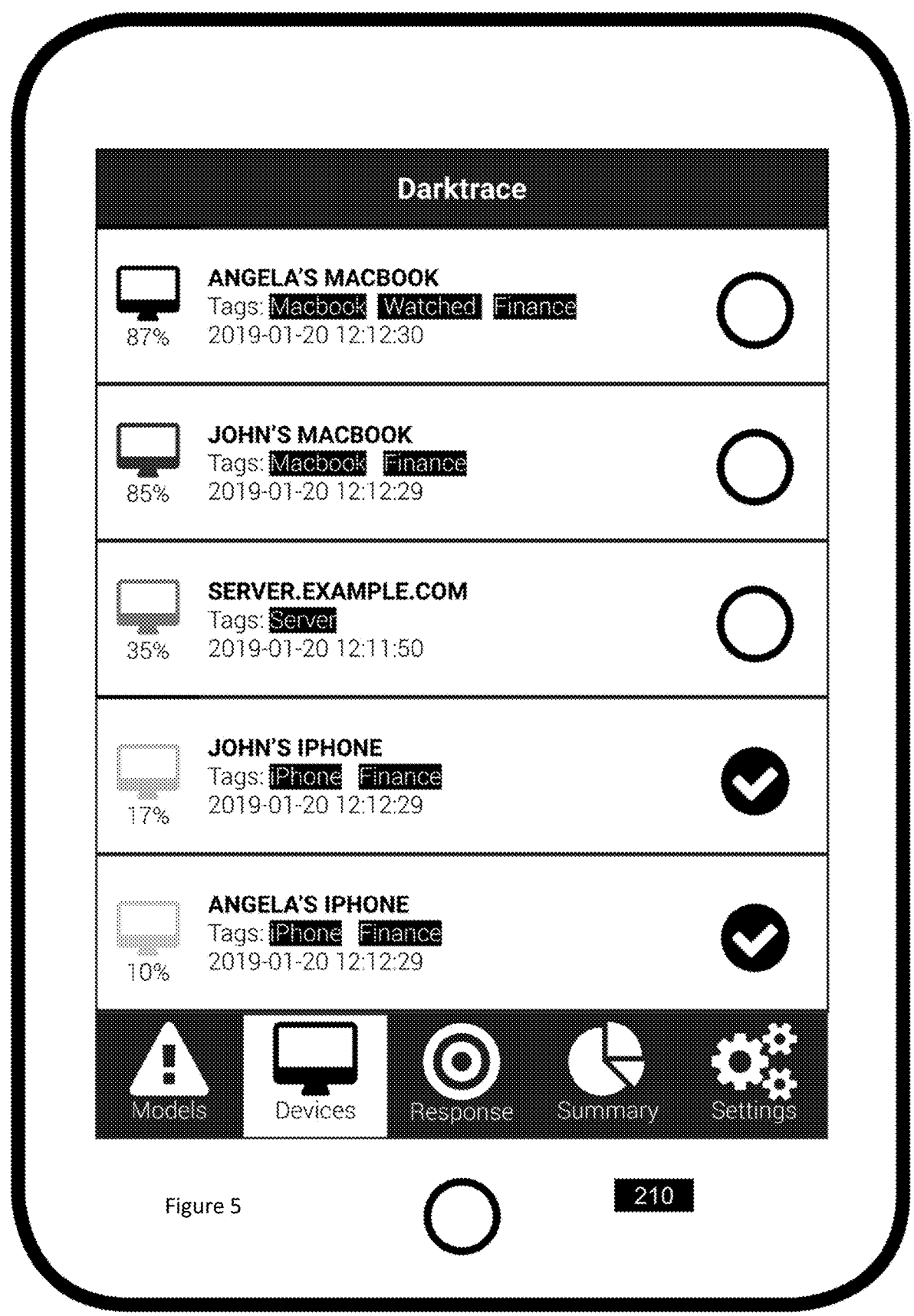
FIG. 5 illustrates a diagram of an example appliance extension with a monitoring module and an investigative module cooperating with the user interface to retrieve and display metrics on potential cyber threats causing a device breach.

Similarly, the Devices Screen displays the list of devices with recent breaches, one row for each unique device which may have multiple breach instances. (See FIG. 5) FIG. 5 illustrates a diagram of an example appliance extension 210 with a monitoring module and an investigative module cooperating with the user interface to retrieve and display metrics on potential cyber threats causing a device breach. The list of devices can be sorted by the device with the highest breach threat score or most recent breach. The breach count shows the number of recent breaches for that device.

Figure 6:
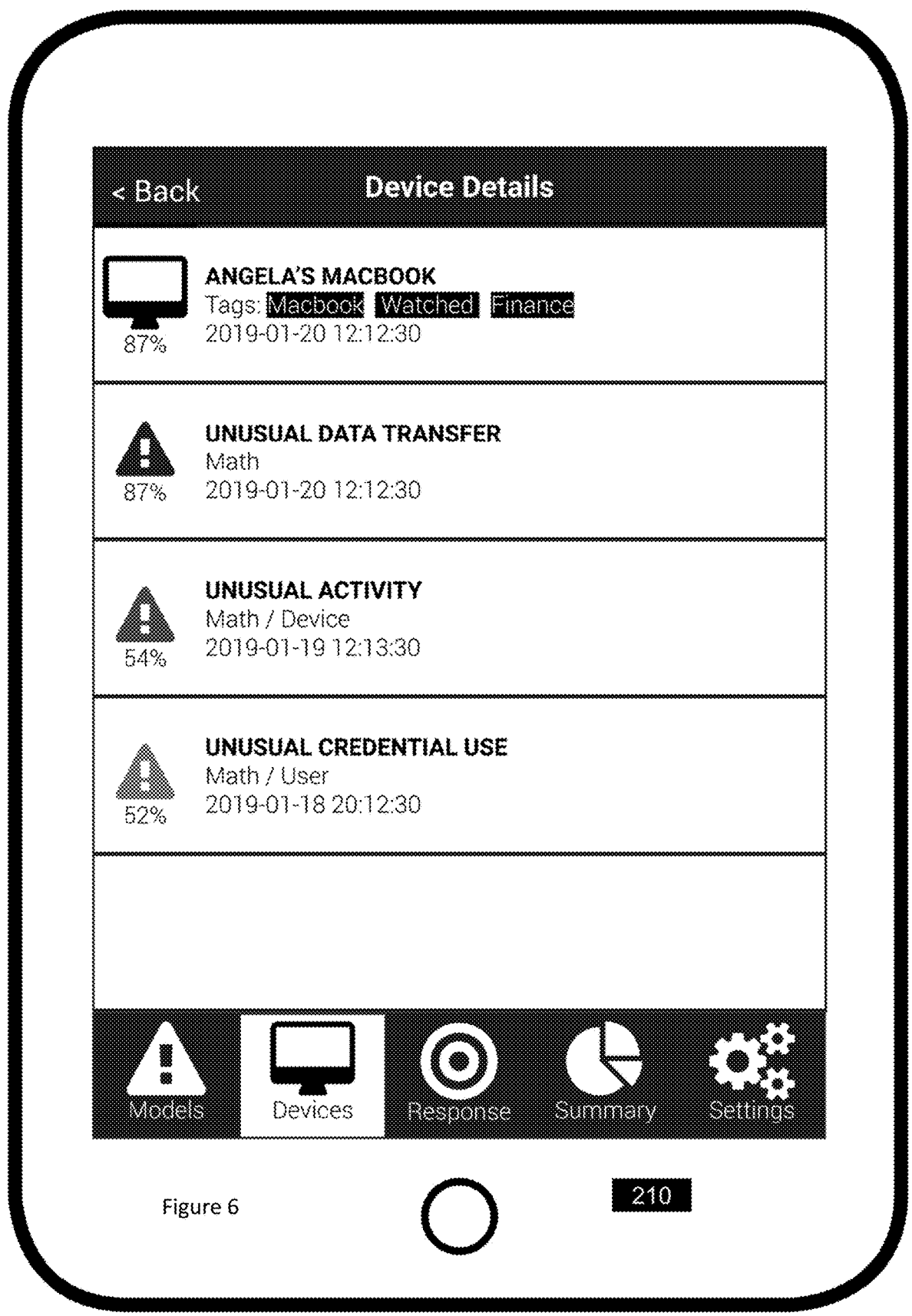
FIG. 6 illustrates a diagram of an example appliance extension with a monitoring module and an investigative module cooperating with the user interface and the cyber security appliance to retrieve and display additional details on a specific device breach.

Tapping on a device breach will open the Device Details screen. (See FIG. 6) FIG. 6 illustrates a diagram of an example appliance extension 210 with a monitoring module and an investigative module cooperating with the user interface and the cyber security appliance to retrieve and display additional details on a specific device breach. This shows all the recent breaches for the selected device. Tapping on a device within the Device Details screen opens a pop-up. With a tap, the security operator drills down a level to see, for example, what URL/IP addresses/host names the user was trying to reach when this device had a breach, a Virtual Machine created by an unusual user, a strange new device seen on the network, etc. The drill down retrieves data to find out a context of details of what caused and lead up to that breach.

Thus, the user interface displays this list of model breaches, devices with breaches, as well as then actions taken in response to these breaches.

Referring to FIGS. 3-6, the investigative module may retrieve and display historic contextual data for investigation purposes. The user interface populates alerts and breaches from the cyber security appliance protecting the system that are contextualized with historic network data including a chain of historically recent devices and models that have been breached to give an operator insight and context into what cyber threat may be happening.

The user interface displays an icon to drill down into either a specific model breach and/or device breach. This gives the ability to retrieve additional data associated with a device and/or the model that has been breached from data stored on the cyber security appliance protecting that system. For each breach, the series of events/chain of events leading up to what caused this to be considered to be a breach. The user interface and modules give the ability to drill down and investigate the breaches, which are sent to the appliance extension 210, rather than just view a simple alert with a high level breakdown and then have to investigate a breach on a separate device/platform.

Moreover, the investigative module also assists in investigating breaches and alerts by, as discussed, having a button to request additional information from the cyber security appliance. However, the module is also configured to be able to add comments into one or more existing records stored on the cyber security appliance. The investigative module is further i) configured to support flagging one or more of the breaches, flagging one or more of the alerts, and any combination of flagging both, as well as ii) configured to support collaborative features, including the ability to 1) add the comment on one or more of the breaches as well as 2) assign one or more breaches to a particular team member with an option to put the comment on a window associated with that breach. The records containing alert information and breach information are formatted to be exportable with the one or more comments and whom on the team has been assigned to follow up on the breach.

Thus, in an embodiment, the mobile application can utilize collaboration features including adding comments to a breach, assigning a breach to a user or group, flagging a breach as needing review or attention by any user or group, and escalating a breach as needing further review or attention. Accordingly, the investigative module is configured such that contextual information is provided and then an operator may acknowledge, comment upon, perform an initial investigation, and assign specific detected cyber threats to a security team member without needing to be present onsite with the cyber security appliance installed in the system.

Next, a Summary screen mirrors the high-level summary information available on the home screen of the threat visualizer user interface of the cyber security appliance. The Summary screen displays metrics about all the devices and traffic, including alerts, the cyber security appliance can see across an organization's enterprise. The Summary screen also indicates any actions taken in response to these breaches, (e.g. assignments, and response actions taken) and controlled devices currently enabled for an autonomous response.

Figure 7:
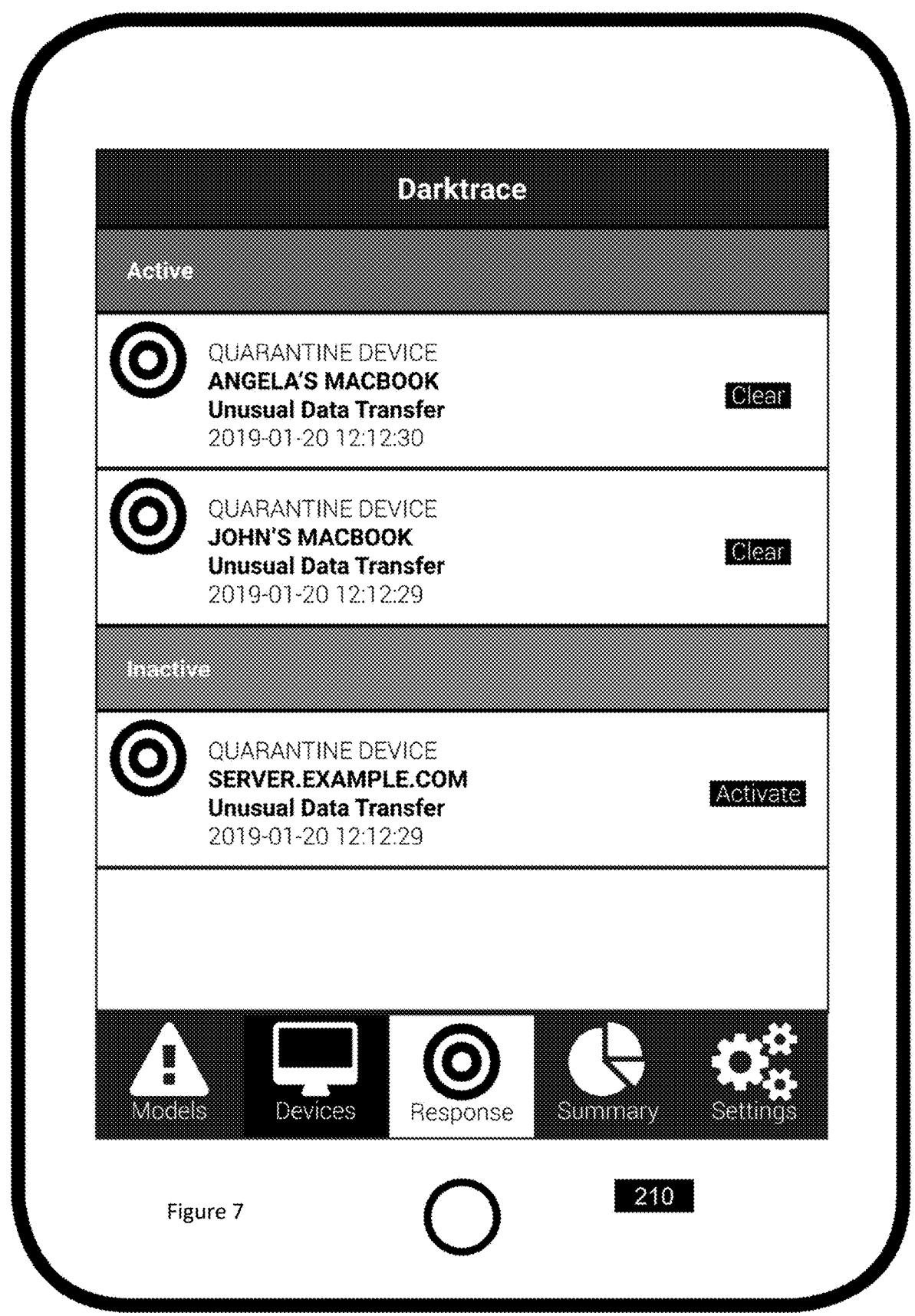
FIG. 7 illustrates a diagram of an example appliance extension with a remote response module cooperating with the user interface.

FIG. 7 illustrates a diagram of an example appliance extension 210 with a remote response module cooperating with the user interface.

The remote response module on the appliance extension 210 can i) approve and initiate suggested actions to counter a detected cyber threat by the autonomous response module in the cyber security appliance as well as ii) have an Activate/Clear button on the user interface to activate a complete hand over of control to take autonomous actions to counter the detected cyber threat in accordance with settings programmed into the autonomous response module in the cyber security appliance. Note, the button may be a slider button, a push button, a tap button, an icon, a link, or other user interface control element.

The screen is configured to accept a user tap to set action control for the autonomous response module. The screen is configured to accept a user tap to 'activate,' on the icon, which will signal the cyber security appliance to start autonomously controlling the device. Thus, 'Active' devices are currently being controlled by the autonomous response module of the cyber security appliance. Tapping 'clear' will signal the cyber security appliance to stop controlling the device.

In Inactive, actions suggested by the autonomous response module need a human to approve the action which can then be implemented by the cyber security appliance.

The remote response module on the appliance extension 210 gives the ability to respond to detected cyber threats when not in the office. The autonomous responses programmed into the autonomous response module of the cyber security appliance, such as quarantine, shut down the device, close a port, remove permissions, etc. can be triggered from the appliance extension 210 itself so the user doesn't have to travel there and respond manually, or if that is necessary, gives them the time to catch up. The ability to control autonomous responses remotely.

The cyber threat defense system acts automatically to restrain or contain threats quickly enough to allow humans to catch up. The user may monitor activities including potential threat activity and initiate defense actions from the smart phone and not need to be on-site in front of the machine hosting their cyber defense application.

The user of the mobile app can interact with and steer the autonomous response that has been initiated by the cyber threat defense system. The cyber threat defense system autonomous will provide the response capability that allows organizations to directly fight back, and networks to self-defend against specific threats, without disrupting the organization.

The cyber threat defense system is capable of taking a range of measured, automated actions in the face of confirmed cyber-threats detected in real time by the cyber threat defense system. Because the cyber threat defense system understands the 'pattern of life' of users, devices, and networks, the cyber threat defense system cooperating with the rest of the platforms is able to take action in a highly targeted manner, mitigating threats while avoiding over-reactions. The mobile app is configured to allow a user from a mobile device to view and alter the response if granted that privilege in the permissions module.

Figure 8:
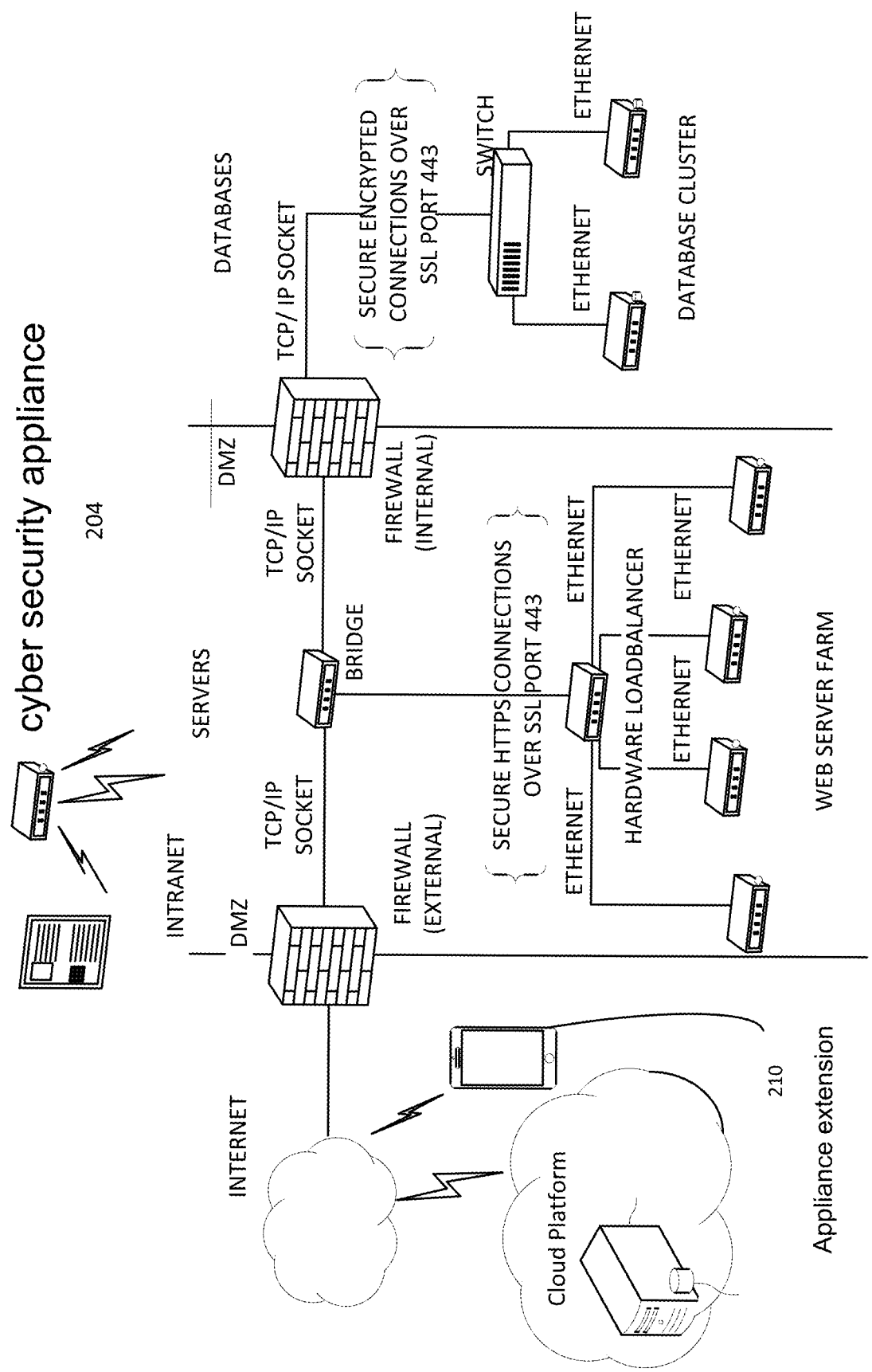
FIG. 8 illustrates a block diagram of an embodiment of an appliance extension and cyber security appliance cooperating to protect an example set of network devices.

FIG. 8 illustrates a block diagram of an embodiment of an appliance extension and cyber security appliance cooperating to protect an example set of network devices. The example network can include one or more firewalls, one or more network switches, one or more computing devices operable by users of the network, bridges, databases, and one or more cyber security appliances 204. The system uses machine learning/Artificial Intelligence to understand what is normal inside a company's network, and when something's not normal. The autonomous response module of the cyber security appliance 204 may invoke automatic responses to disrupt the cyber-attack until the human team can catch up or at the very least suggest a response it wants to take. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

Figure 9:
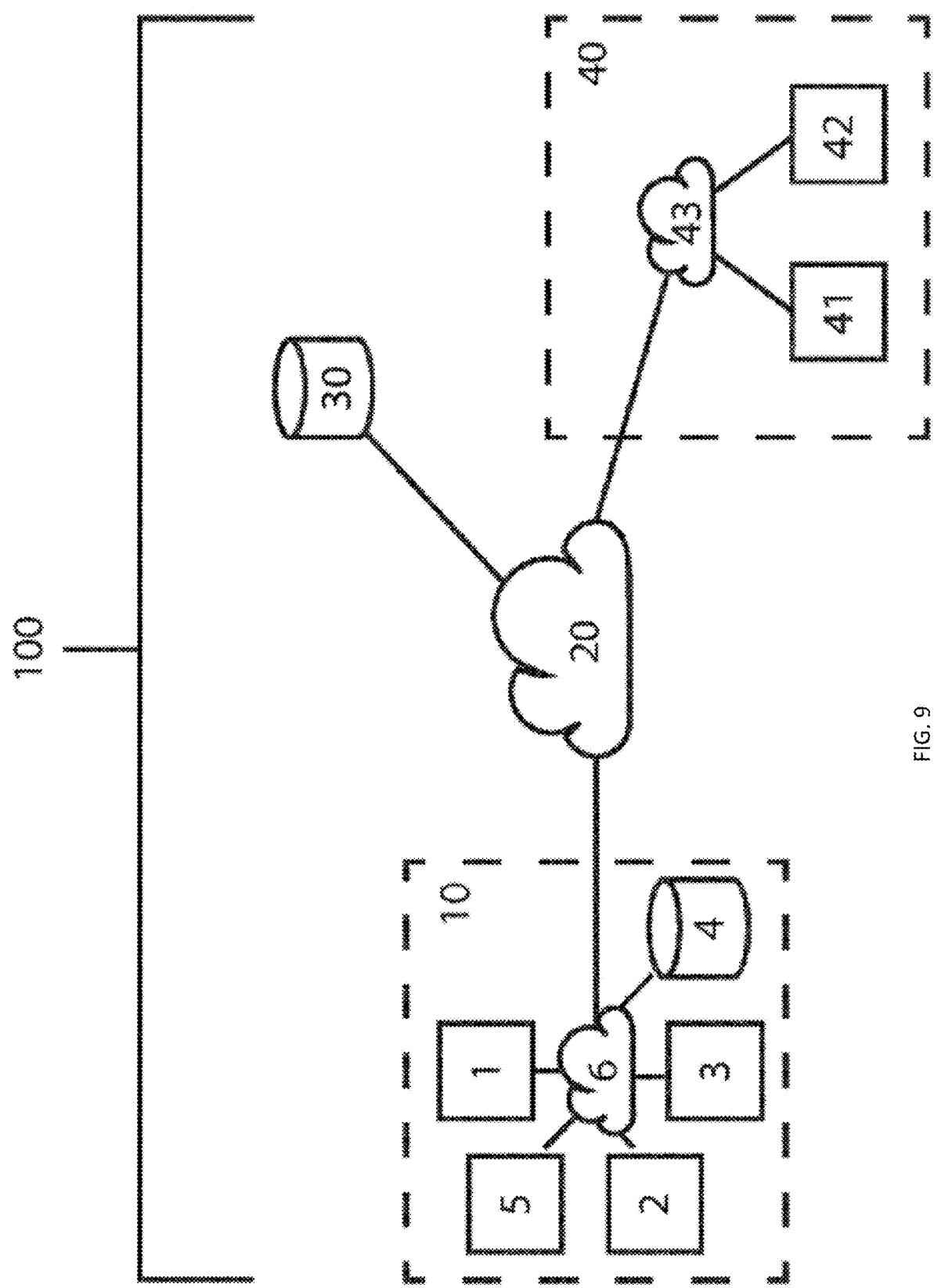
FIG. 9 illustrates an example cyber threat defense system, including the cyber defense appliance and its appliance extensions, protecting an example network.

FIG. 9 illustrates an example cyber threat defense system, including the cyber defense appliance and its appliance extensions, protecting an example network. The example network FIG. 9 illustrates a network of computer systems 100 using a threat detection system. The system depicted by FIG. 9 is a simplified illustration, which is provided for ease of explanation of the invention. The system 100 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 9.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without pre-defined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine learning methods do not require training data with pre-defined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access;

Data access;

Timings of events;

Credential use;

DNS requests; and other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

Analyzes behavior in the context of other similar devices on the network;

Algorithms identify naturally occurring groupings of devices—impossible to do manually; and Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the malicious individuals and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:

The number of bytes of data entering or leaving a networked device per time interval.
File access.
The commonality/rarity of a communications process
Invalid SSL certification.
Failed authorization attempt.
Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.
The number of internal link-local IP Broadcast requests originating from a networked device.
The size of the packet payload data.
The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.
The number of SMTP, POP or IMAP logins or login failures a machine generates per time interval.
The number of LDAP logins or login failures a generated.
Data transferred via file sharing protocols such as SMB, SMB2, FTP, etc.
Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. The functionality performed by one or modules may be combined into a single module, where logically possible, and a modules functionality may be split into multiple modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
an appliance extension configured to perform functions with i) a monitoring module configured to monitor metrics and receive alerts regarding potential cyber threats on a system that includes 1) an email system, 2) a network, 3) a Software as a Service (SaaS) environment, 4) a cloud system, and 5) any combination of the email system, the network, the SaaS environment, and the cloud system, ii) an investigative module configured to retrieve and display metrics on a user interface to support investigations on potential cyber threats, as well as iii) a remote response module configured to observe and send one or more control signals to an autonomous response module to take actions to counter one or more detected cyber threats, remotely from this appliance extension, where the appliance extension has the user interface to be displayed on a display screen, and instructions associated with one or more of the modules, which at least includes the autonomous response module, the investigative module, the remote response module, and the monitoring module, to be stored in one or more memories and to be executed by one or more processors, where the appliance extension is a mobile application installed on a smart mobile device that needs to be registered, where the appliance extension is designed and constructed to be a secure extension of a second user interface of a cyber security appliance installed in the system with a limited set of functions including the monitoring, the investigating, and the taking actions to counter the detected cyber threat, all of which an operator can securely take from the mobile application running on the smart mobile device; rather than, needing to log into the cyber security appliance and investigate potential cyber threats at a location where the cyber security appliance is installed in the system, where the registered mobile application on the smart device and the cyber security appliance is configured to communicate securely via a backend server, via at least 1) using a secure protocol as well as 2) requiring a need to authenticate communications with a unique and verifiable signature, not a public Internet Protocol (IP) address, from i) an instance of the registered mobile application, ii) the cyber security appliance installed in the system, or iii) unique signatures of both the cyber security appliance and the instance of the registered mobile application.

2. The apparatus of claim 1, further comprising:
a permissions module configured to allow an administrator to authorize a particular user that can register the instance of the appliance extension as well as configured that when the administrator revokes the particular user's permission to use the appliance extension, then a communication is sent to the appliance extension to cause deletions of data and instructions for the appliance extension to occur.

3. The apparatus of claim 1, wherein a remote response module on the appliance extension is configured to i) approve and initiate suggested actions to counter a detected cyber threat by the autonomous response module in the cyber security appliance as well as ii) have a first button on the user interface to confirm that the cybersecurity appliance itself can take autonomous actions to counter the detected cyber threat in accordance with recommendations made by the autonomous response module in the cyber security appliance.

4. The apparatus of claim 1, wherein the investigative module is further configured to investigate breaches by having a button to view additional contextual information from the cyber security appliance as well as being able to add comments into one or more existing records stored on the cyber security appliance.

5. The apparatus of claim 4, wherein the investigative module is further i) configured to support flagging one or more of the breaches, flagging one or more of the alerts, and any combination of flagging both, as well as ii) configured to support collaborative features including the ability to 1) add a comment on one or more of the breaches as well as 2) assign one or more breaches to a particular team member with an option to put the comment on a window associated with that breach, where records containing breach information are formatted to be exportable with the one or more comments and whom on the team has been assigned to follow up on the breach.

6. The apparatus of claim 1, where the monitoring module is further configured to receive data payload in communications securely transmitted from the cyber security appliance, via using a security protocol as well as encrypting data payload itself being transmitted between the appliance extension and the cyber security appliance installed in the system, where the appliance extension has one or more cypher algorithms to decipher the encrypted data payload.

7. The apparatus of claim 6, where the investigative module is further configured such that contextual information is provided and then an operator can acknowledge, comment upon, perform an initial investigation, and assign specific detected cyber threats to a security team member without needing to be present onsite with the cyber security appliance installed in the system.

8. The apparatus of claim 1, where the investigative module is further configured to retrieve and display historic contextual data for investigation purposes, where the user interface is configured to populate alerts and breaches from the cyber security appliance protecting the system that are contextualized with historic data including a chain of historically recent devices and models that have been breached to give an operator insight and context into what cyber threat can be happening as well as an ability to retrieve additional data associated with a particular device and/or a particular model that has been breached from data stored on the cyber security appliance protecting that system.

9. The apparatus of claim 1, where the instance of the registered mobile application is required to be registered with the backend server that is configured to communicate with the cyber security appliance, and authenticate its user; and in addition, the instance of the registered mobile application is configured to cooperate with a camera of the smart mobile device to scan a Quick Response (QR) code generated from within the second user interface for the cyber security appliance, which will also be utilized to verify whether this instance of the registered mobile application is allowed to communicate with the cyber security appliance installed in the system.

10. A method for an appliance extension for a cyber security appliance, comprising:
configuring the appliance extension to perform functions with i) a monitoring module configured to monitor metrics and receive alerts regarding potential cyber threats on a system that includes 1) an email system, 2) a network, 3) a Software as a Service (SaaS) environment, 4) a cloud system, and 5) any combination of the email system, the network, the SaaS environment, and the cloud system, ii) an investigative module configured to retrieve and display metrics on a user interface to support investigations on potential cyber threats, as well as iii) a remote response module configured to observe and send one or more control signals to an autonomous response module to take actions to counter one or more detected cyber threats, remotely from this appliance extension;
configuring the user interface to be displayed on a display screen; and
configuring instructions associated with one or more of the modules, which at least includes the autonomous response module, the investigative module, the remote response module, and the monitoring module, to be stored in one or more memories and to be executed by one or more processors, where the appliance extension is a mobile application installed on a smart mobile device that needs to be registered;
configuring the appliance extension to be a secure extension of a second user interface of the cyber security appliance installed in the system with a limited set of functions including the monitoring, the investigating, and the taking actions to counter the detected cyber threat, all of which an operator can securely take from the mobile application running on the smart mobile device; rather than, needing to log into the cyber security appliance and investigate potential cyber threats at a location where the cyber security appliance is installed in the system;

configuring the registered mobile application on the smart device and the cyber security appliance to communicate securely via a backend server, via at least 1) using a secure protocol as well as 2) requiring a need to authenticate communications with a unique and verifiable signature, not a public Internet Protocol (IP) address, from i) an instance of the registered mobile application, ii) the cyber security appliance installed in the system, or iii) unique signatures of both the cyber security appliance and the instance of the registered mobile application.

11. The method of claim 10, further comprising:

configuring a permissions module to allow an administrator to authorize a particular user that can download and register the instance of the appliance extension; as well as configuring when the administrator revokes the particular user's permission to use the appliance extension, then a communication is sent to the appliance extension to cause deletions of data and instructions for the appliance extension to occur.

12. The method of claim 10, further comprising:

configuring a remote response module on the appliance extension to i) approve and initiate suggested actions to counter a detected cyber threat by the autonomous response module in the cyber security appliance as well as ii) have a first button on the user interface to activate a complete hand over of control to take autonomous actions to counter the detected cyber threat in accordance with settings programmed into the autonomous response module in the cyber security appliance.

13. The method of claim 10, further comprising:

configuring the investigative module to investigate breaches by having a button to view additional contextual information from the cyber security appliance as well as being able to add comments into one or more existing records stored on the cyber security appliance.

14. The method of claim 13, further comprising:

configuring the investigative module i) to support flagging one or more of the breaches, flagging one or more of the alerts, and any combination of flagging both, as well as ii) to support collaborative features including the ability to 1) add a comment on one or more of the breaches as well as 2) assign one or more breaches to a particular team member with an option to put the comment on a window associated with that breach, where records containing breach information are formatted to be exportable with the one or more comments and whom on the team has been assigned to follow up on the breach.

15. The method of claim 10, further comprising:

configuring the monitoring module to receive data payload in communications securely transmitted from the cyber security appliance, via using a security protocol as well as encrypting data payload itself being transmitted between the appliance extension and the cyber security appliance installed in the system, where the appliance extension has one or more cypher algorithms to decipher the encrypted data payload.

16. The method of claim 10, further comprising:

configuring the investigative module to retrieve and display historic contextual data for investigation purposes, where the user interface is configured to populate alerts and breaches from the cyber security appliance protecting the system that are contextualized with historic data including a chain of historically recent devices and models that have been breached to give an operator insight and context into what cyber threat can be happening as well as an ability to retrieve additional data associated with a device and/or a model that has been breached from data stored on the cyber security appliance protecting that system.

17. The method of claim 10, where the instance of the registered mobile application is required to be registered with the backend server that is configured to communicate with the cyber security appliance, and authenticate its user; and in addition, the instance of the registered mobile application is configured to cooperate with a camera of the smart mobile device to scan a Quick Response (QR) generated from within the second user interface for the cyber security appliance, which will also be utilized to verify whether this instance of the registered mobile application is allowed to communicate with the cyber security appliance installed in the system.

18. A non-transitory computer readable medium comprising computer readable code operable, when executed by one or more processing apparatuses in the computer system to instruct a computing device to perform the method of claim 10.

* * * * *